United States Patent [19]
Bauchet et al.

[11] 3,751,903
[45] Aug. 14, 1973

[54] HYDROSTATIC TRANSMISSION CONTROL DEVICES

[75] Inventors: Pierre Bauchet; Jean-Claude Carre, both of Billancourt, France

[73] Assignee: Regie National Des Usines Renault, Billancourt (Hauts de Seine), France

[22] Filed: Dec. 2, 1971

[21] Appl. No.: 204,214

[30] Foreign Application Priority Data
Dec. 4, 1970 France .......................... 7043696
June 2, 1971 France .......................... 7119897

[52] U.S. Cl. .......................... 60/19, 60/423, 60/431
[51] Int. Cl. .......................... F02b 41/00
[58] Field of Search .......................... 60/19, 423, 431

[56] References Cited
UNITED STATES PATENTS

| | | | |
|---|---|---|---|
| 2,393,882 | 1/1946 | Blair | 60/19 |
| 2,657,918 | 11/1953 | Parker | 60/19 |
| 2,976,685 | 3/1961 | Thoma et al. | 60/19 X |
| 3,003,309 | 10/1961 | Bowers et al. | 60/19 |
| 3,139,723 | 7/1964 | Hollowell | 60/19 |

*Primary Examiner*—Edgar W. Geoghegan
*Attorney*—Stevens, Davis, Miller & Mosher

[57] ABSTRACT

A control device which comprises a rotary power generator such as a thermal engine of which the momentary torque is subordinate to the position of an adjustment member, and a variable-ratio hydraulic transmission, the position of said adjustment member being measured in a manner known per se by a proximity detector of which the output signal is fed to a governor assembly controlling the increment or the reduction in the transmission ratio if the engine torque is higher or lower with respect to a reference value.

The control device is applicable notably to farming machines and earthmoving and public work machines, and affords an optimum use of the engine power output by controlling the transmission ratio accordingly.

10 Claims, 22 Drawing Figures

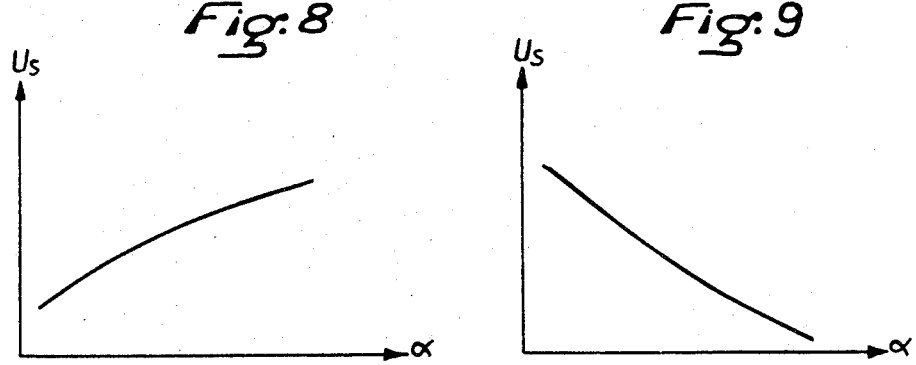
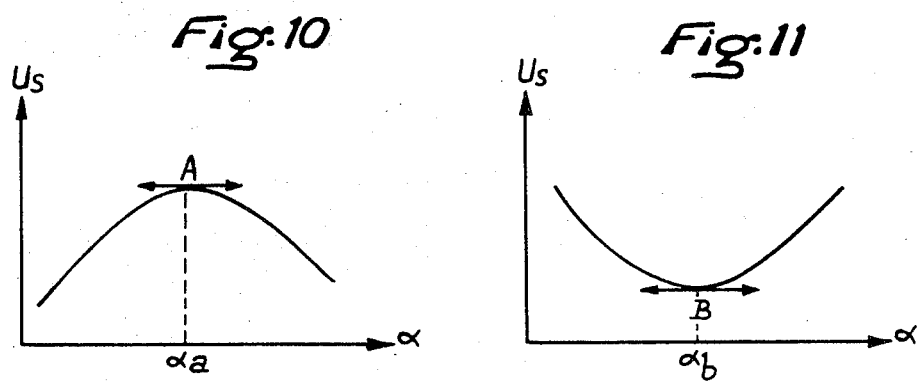
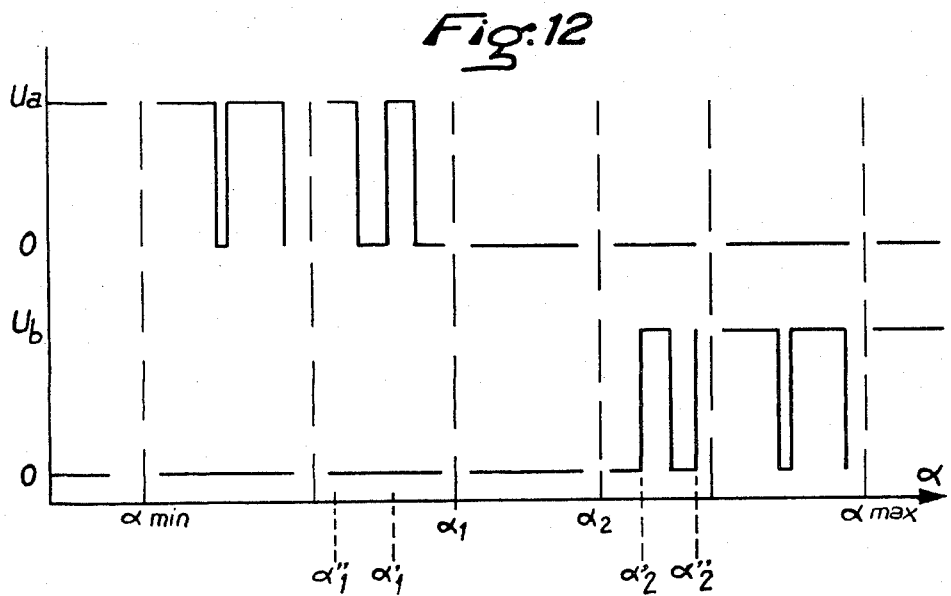

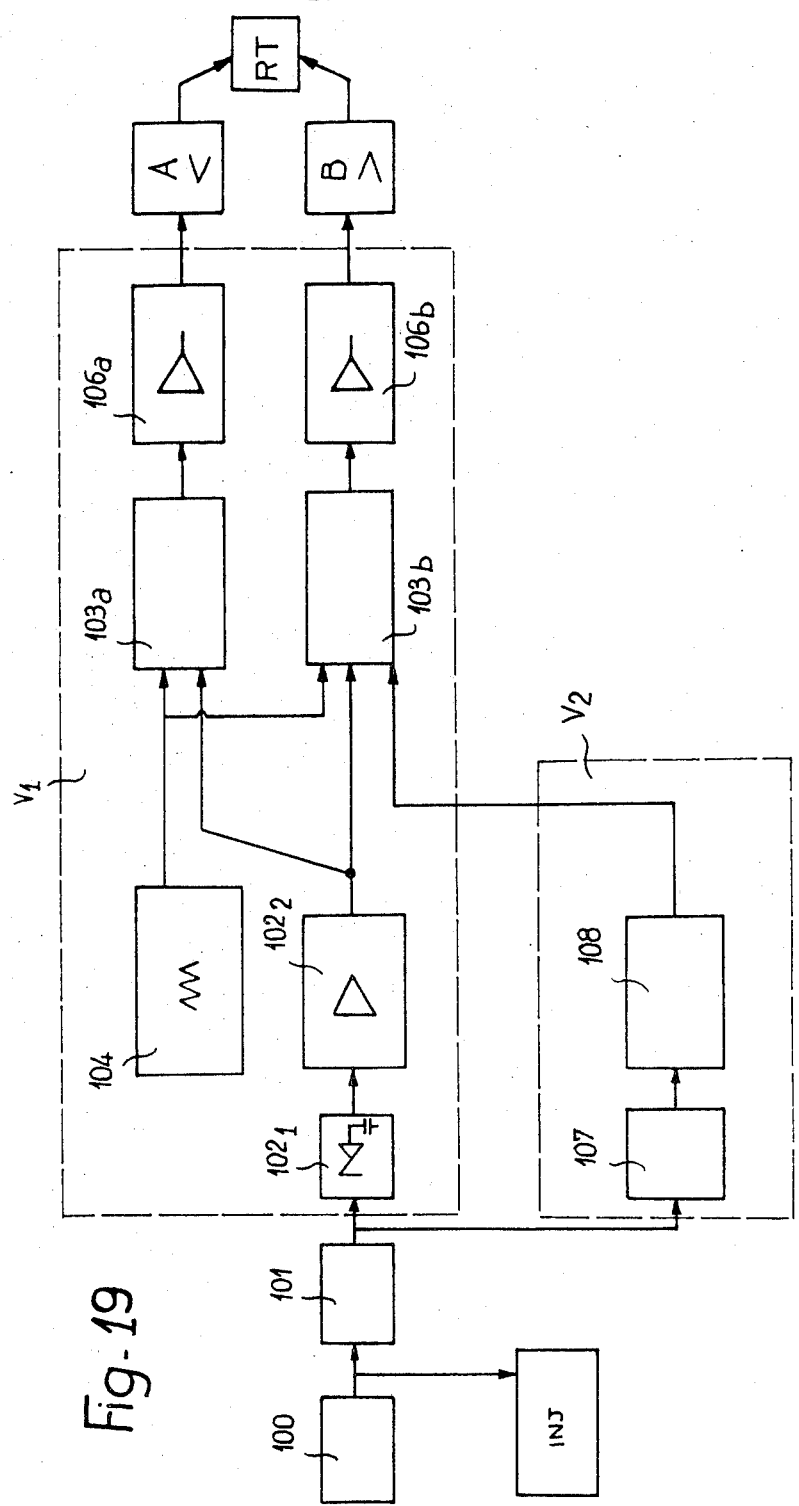

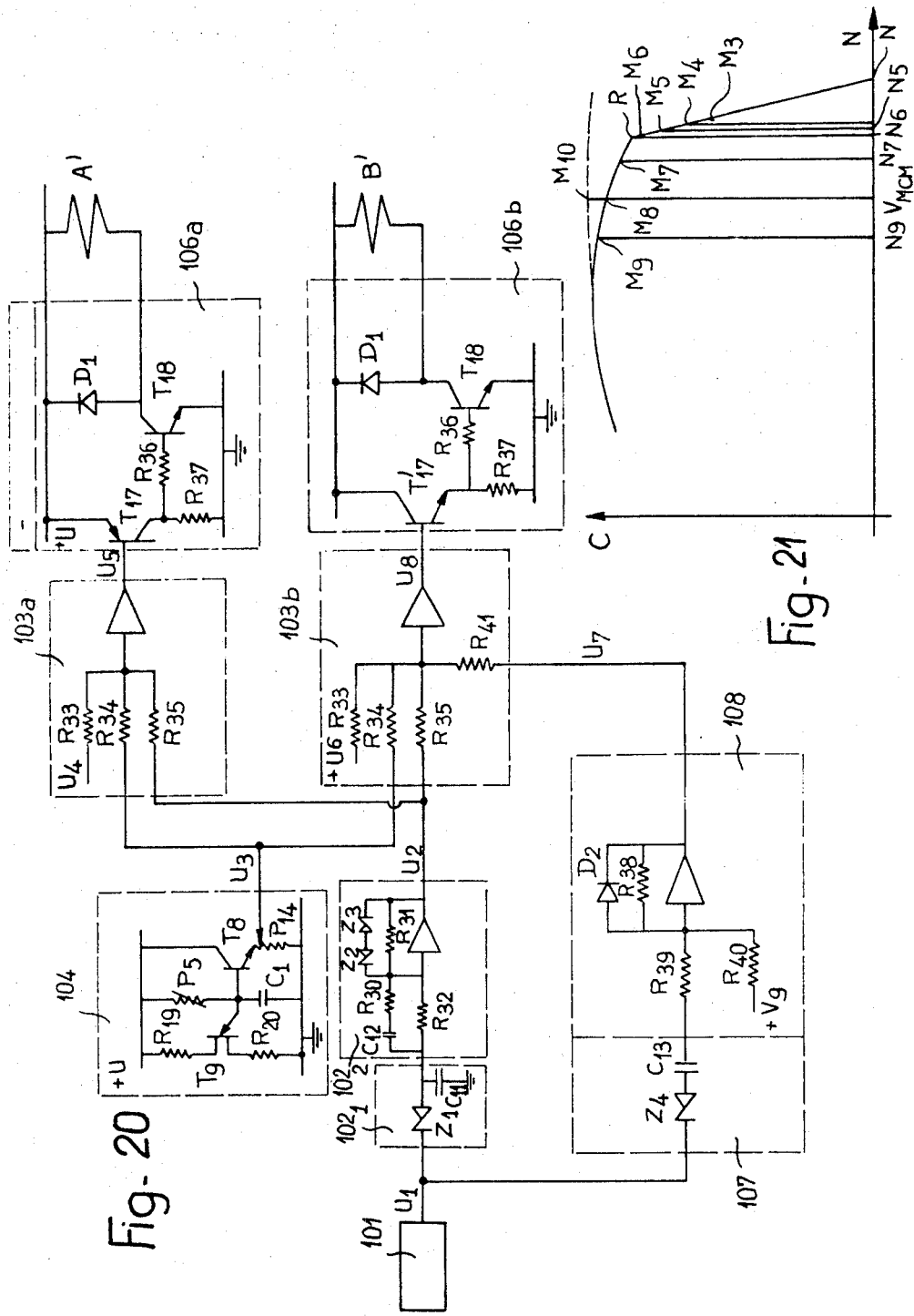

HYDROSTATIC TRANSMISSION CONTROL DEVICES

The present invention relates in general to driven or moving equipment or machines incorporating a continuous-variation transmission mechanism, wherein the power generator may consist for example of a direct-injection engine such as a Diesel or a compression-ignition engine to which fuel is fed through a volumetric injection pump.

The operation of machines of this general type, notably in the field of farming machines and public work or earthmoving machines, is such that the driver has to select a power generator rotational speed and a transmission ratio suitable for driving the machine at a constant speed while performing the work contemplated such as ploughing, levelling, grading, loading a bucket, etc...

When a variation occurs in the conditions of operation of the machine, for eaample in case of an inrement in the ground reaction or resistance, the power output of the generator becomes insufficient and in this case if the driver does not increase rapidly the transmission ratio and thus reduce the velocity of translation of the machine, the engine may stall when its maximum power output is attained. Once the obstacle is cleared or the resistance overcome, the driver must of course restore the initial transmission ratio for continuing work at the desired speed.

In other machines, such as harvesters or hydraulic, multi-pump power shovels, the primary power generator drives a plurality of transmission mechanisms and it is desirable that the total amount of power absorbed by these mechanisms should remain below the rated power of the generator. In case of an increment in the total amount of absorbed power the driver must control one or more transmission mechanisms in order to prevent the Diesel engine from stalling.

In all these machines the operating characteristics selected by the driver are the primary power unit speed and the transmission ratio. Thus, a constant speed is available at the output end of the transmission, irrespective of the power absorption. Obviously, this mode of operation is basically opposed to that of road vehicles which constantly endeavour to obtain a maximum output speed for a given power output of the engine.

Devices for limiting the absorbed power in a hydraulic power shovel comprising oneor a plurality of variable-capacity pumps are already known. The principle of operation of these devices is based on the measurement of the global torque. This measurement is effected by means of a piston device wherein the number of pistons corresponds to the number of pumps. The pistons are aligned in this case and displaceable under the control of the pressure created in the corresponding pump, against the force of calibrated return springs. The piston movements are communicated to the barrel or cylinder-block support, or the impeller or swash plate of the pumps. For a given pressure in each pump a piston position is determined which defines in turn the cylinder capacity of each pump and therefore a torque.

This device, which is the most popular one in the field, due to its extreme simplicity, is objectionable on account of its disputable precision, for the maximum resistant torque must be definitely smaller than the torque which the engine is capable of delivering, this engine torque being also variable under parameters such as temperature, humidity, atmospheric pressure, etc...

Therefore, thermal engines having a "falling" torque vs. speed curve are used.

Thus, when the pumps tend to reduce the speed of the Diesel engine, the engine torque increases and prevents it from stalling. This method proves that Diesel engines are operated at power ratings definitely lower than those for which they are actually designed.

Other devices have also been developed which operate by measuring the actual torque delivered by the Diesel engine through the measurement of the position of the injection pump output regulating member. These devices utilize fuel injection pumps wherein the number of pistons is equal to the number of engine cylinders. The operation of this device is based on the detection of the position of the rack provided for adjusting the cylinder capacity of the injection pump. In fact, when this rack is in its end position, the fuel injection pump delivers the maximum fuel output and the Diesel engine delivers the maximum torque. This device utilizes a hydraulic valve actuated by the aforesaid rack when the latter is in its end or maximum-output position, and supplies hydraulic fluid under pressure to an actuator of the cylinder and piston type controlling the transmission ratio. However, this device cannot be used unless substantial modifications are brought to the injection pump.

Moreover, if for any reason the valve is not actuated smoothly, the regulation of the injection pump is disturbed. Finally, this device is not applicable to single-piston and rotary distributor fuel injection pumps.

The known devices based on these hydromechanical assemblies are seldom satisfactory for they lack precision and reliability, since they are subject to modifying factors such as frictional contacts, variations in the fluid viscosity, manufacturing or machining tolerances, etc...

To avoid the above-listed inconveniences the present invention provides :

a device for permanently measuring the ratio of the abosorbed power to the maximum or permissible power output of the Diesel engine, irrespective of the machine speed. With this procedure it is possible to make the best possible use of the power output available by simply modifying the transmission ratio, a device for measuring the engine power or torque, which is constantly insensitive to the operation of the injection pump since, more particularly, the pump elements do not drive any part exposed to frictional contacts or disturbing stresses, a governor device capable of increasing the transmission ratio when the power measuring device detects an increment in the absorbed power beyond a predetermined threshold and maintaining the transmission ratio to a value such that the absorbed power remains substantially equal to the maximum power available, a governor device capable of increasing the transmission ratio and preventing any automatic reduction in this transmission ratio as a consequence of a reduction in the resistant effort. This reduction in the transmission ratio is subjected to a preliminary decision of the driver of the machine. In this respect it may be pointed out that this particular mode of operation constitutes a valuable safety feature in the case of machines such as loaders or bulldozers since it prevents the machine from accelerating when the load decreases. These two modes of operation may be combined together in the same machine comprising to this end means for selecting either of these modes of operation, a governor device adapted to increase the transmission ratio of a plurality of elementary transmissions driven from a common power source when the power measuring device has detected a condition wherein the absorbed power becomes greater than a predetermined value.

In this case, the increment in the transmission ratio takes place in a predetermined order, the ratio of the second transmission being increased only if the increment in the ratio of the first transmission is not sufficient for restoring the absorbed power to a value lower than the available power output.

The preselected values are restored subsequently in the reverse order either automatically or according to the driver's desire. This mode of operation is employed in machines having two different and mutually responsive or related functions (for example in the case of scraper) wherein the vehicle propelling function and th earth loading function are differentiated yet so linked that in case of an increment in the velocity of translation of the vehicle the power required for loading the earth is also reduced.

According to this invention, the device for controlling the continuous-variation transmission mechanism having the absorbed-power limiting feature, which comprises a rotary power generator of which the momentary torque is subordinate to the position of an adjustment member and a variable-ratio hydraulic transmission, is characterized in that the position of the adjustment member is measured in a manner known per se by a proximity detector producing an output signal fed to a governor assembly controlling the increase or decrease in the transmission ratio, according to the engine torque becoming greater or lower than a reference value.

The device according to this invention may thus comprise three basic assemblies, namely :

the engine torque detecting assembly, a governor or like assembly for building up the orders of variation of the transmission ratio, and the transmission ratio control assembly.

It will be noted that the component elements of these three assemblies may be new or known, for this invention is concerned primarily with the combination of the torque detecting assembly with the order built-up sub-assemby and the control sub-assembly.

In the following disclosure reference is made more particularly to the manner in which the load of a Diesel engine, equipped with a specific type of fuel injection pump, is detected. But it will readily appear as obvious to those conversant with the art that the device of this invention is applicable to any other type of engine and to any other type of fuel injection pump, provided that the fuel output of this pump be a known function of the position of a mechanical adjustment member.

The features and advantages characterizing this invention will become apparent as the following description proceeds with reference to the accompanying drawings illustrating diagrammatically by way of example a typical form of embodiment of the invention. In the drawings.

Figure 13:
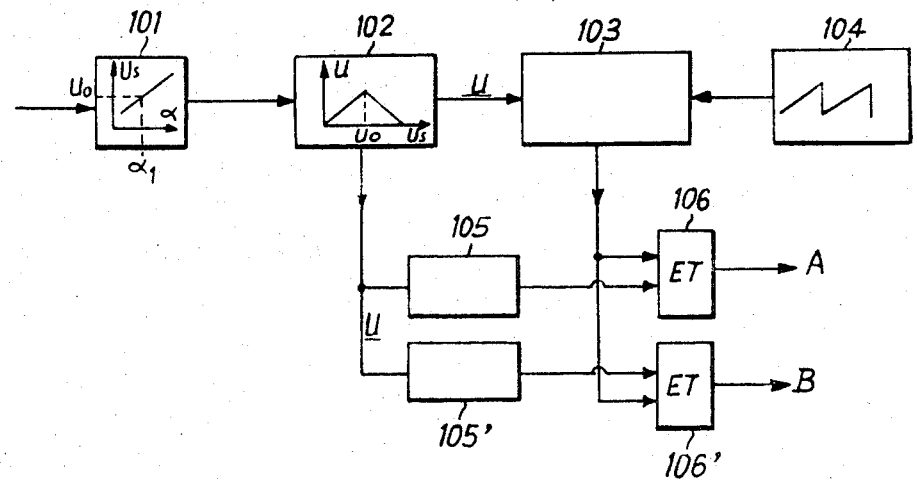
Figure 14:
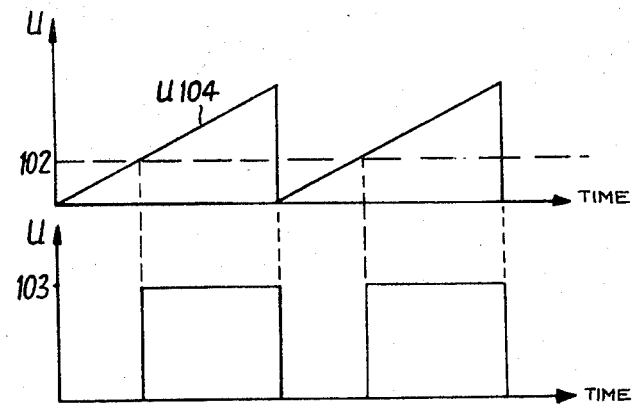
Figure 15:
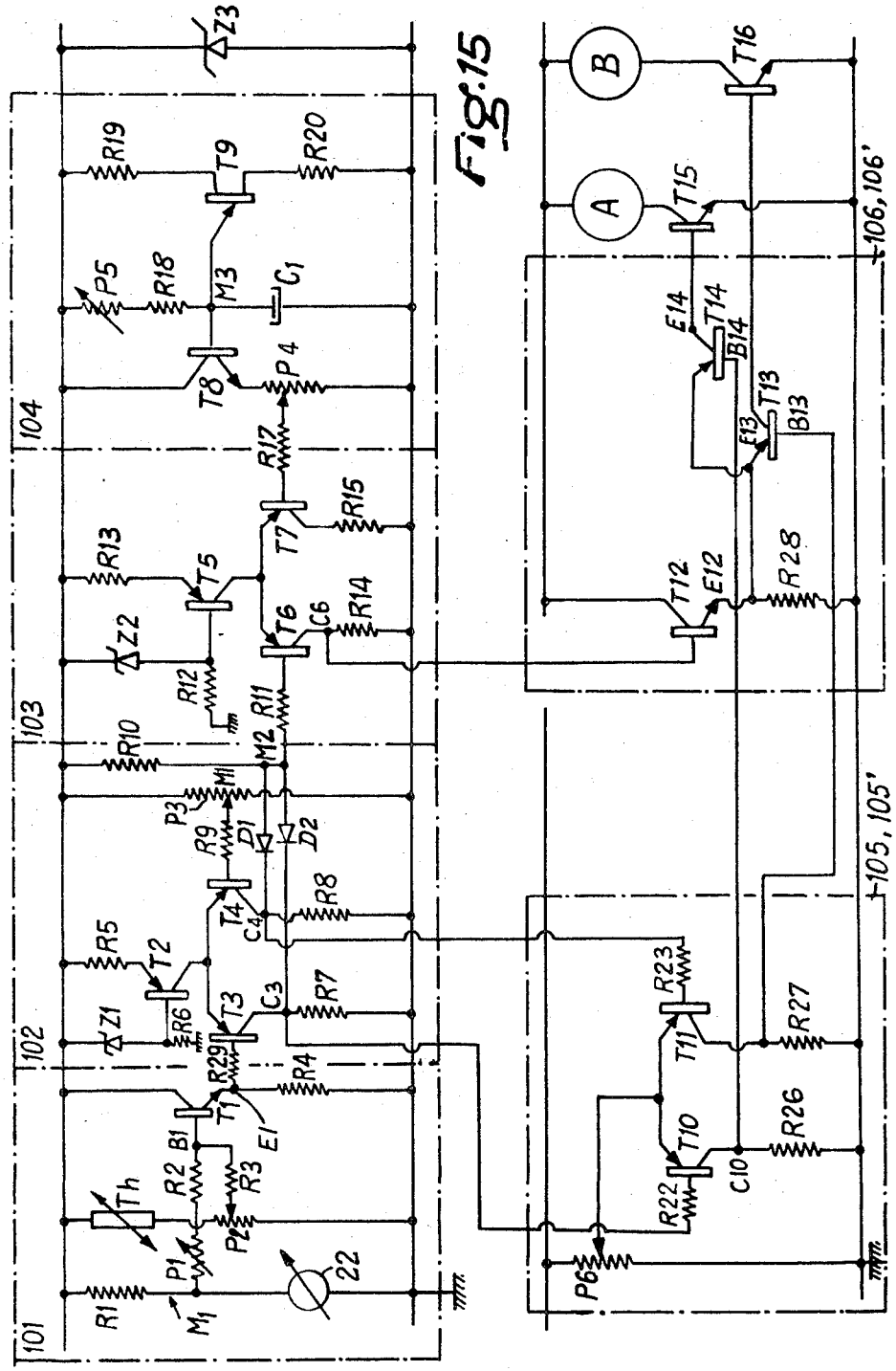
Figure 16:
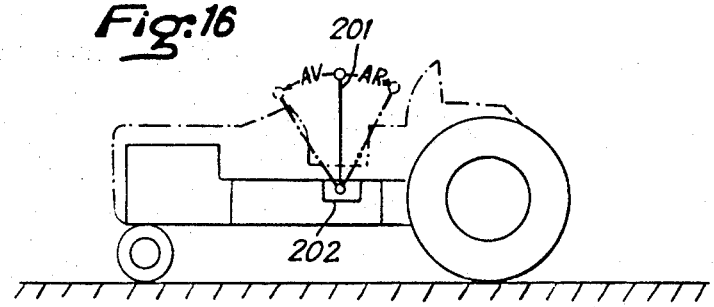
Figure 17:
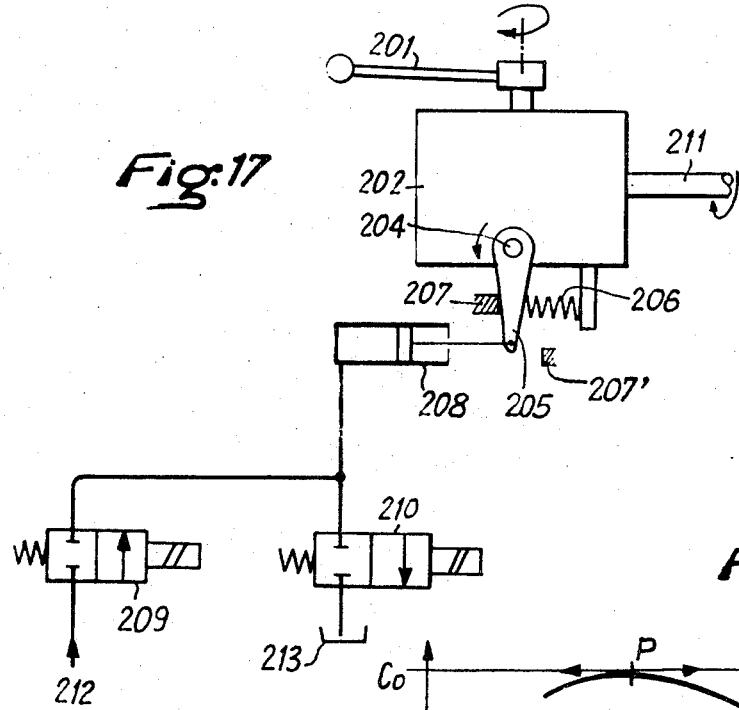
Figure 18:
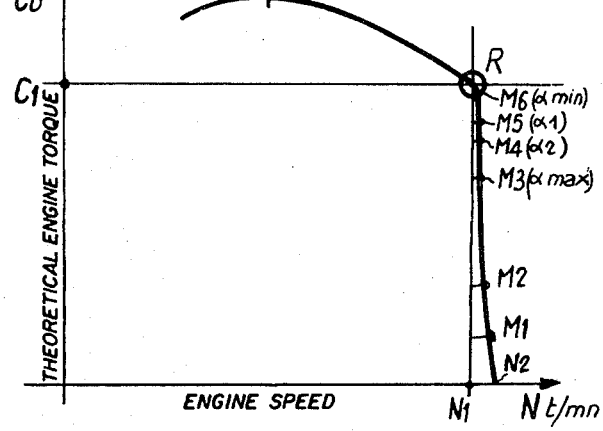
Figure 22:
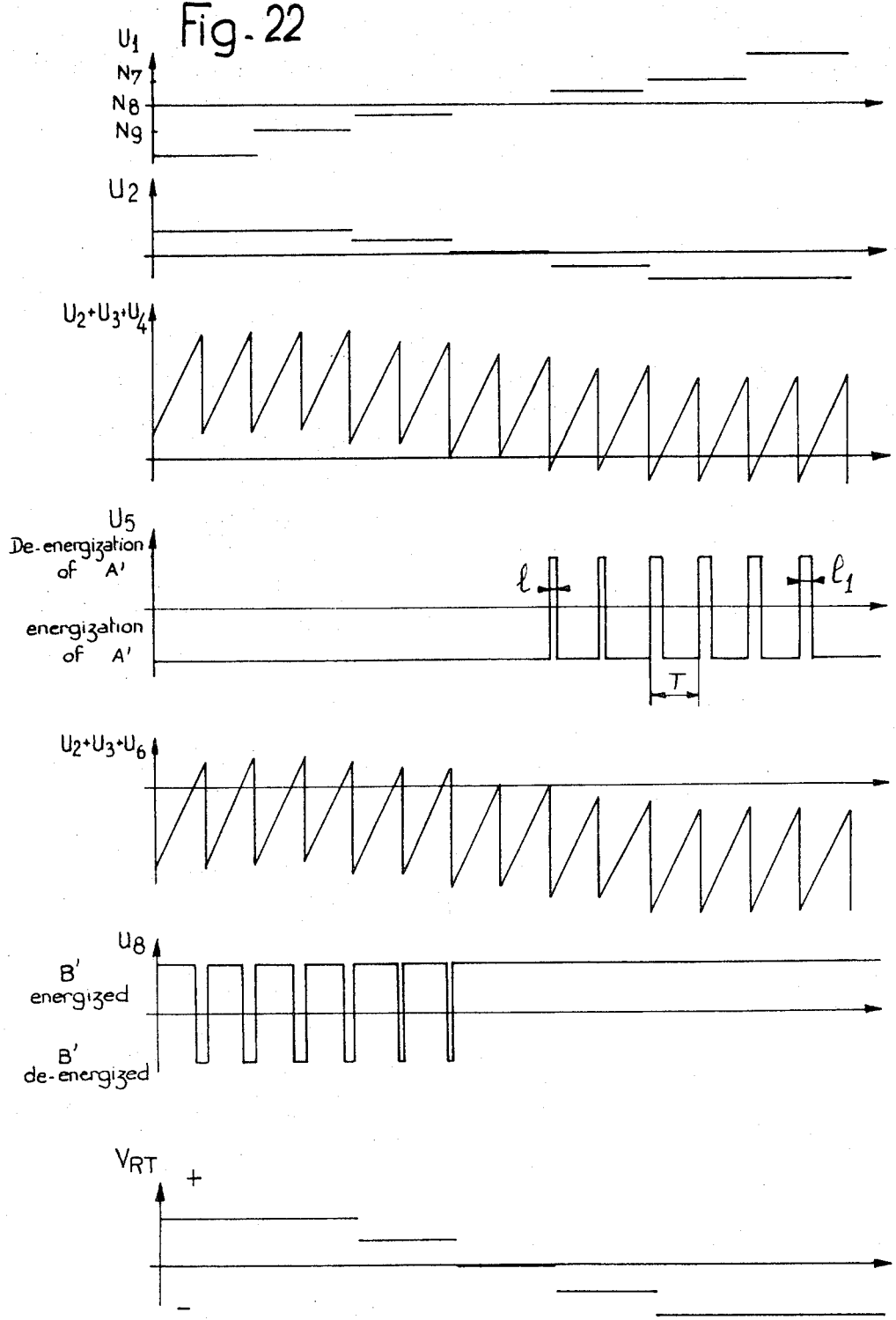

FIGS. 8 to 11 inclusive illustrate four typical examples of output voltage curves of the proximity detector as a function of the angular position of th adjustment control member ;

FIG. 12 is a diagram illustrating the signals delivered by the order building assembly ;

FIG. 13 is a block diagram of the circuit means provided for building up the orders ;

FIG. 14 is another diagram illustrating the output signals delivered by one of the voltage comparator member of the measuring assembly ;

FIG. 15 is a wiring diagram illustrating the order building sub-assembly ;

FIG. 16 is a diagrammatic illustration of a vehicle equipped with the control device of this invention ;

FIG. 17 is the diagrammatic illustration of the hydraulic circuit of the device ;

FIG. 18 is a diagram showing the curve of variation of the engine torque as a function of the rotational velocity of the engine ;

FIG. 19 is a block diagram illustrating a modified form of embodiment of the order building assembly, which comprises stalling preventing means ;

FIG. 20 is a wiring diagram of the assembly of FIG. 19 ;

FIG. 21 is a diagram showing the curve of vairation of the engine torque as a function of the rotational velocity of the engine, and FIG. 22 is a diagrammatic illustration of the various signals produced in the assembly of FIG. 20.

ENGINE TORQUE DETECTING ASSEMBLY

The mode of operation of the fuel injection pump proper, which is no part of this invention, is briefly described hereinafter only to the extent necessary for a clear understanding of the invention.

Figure 1:
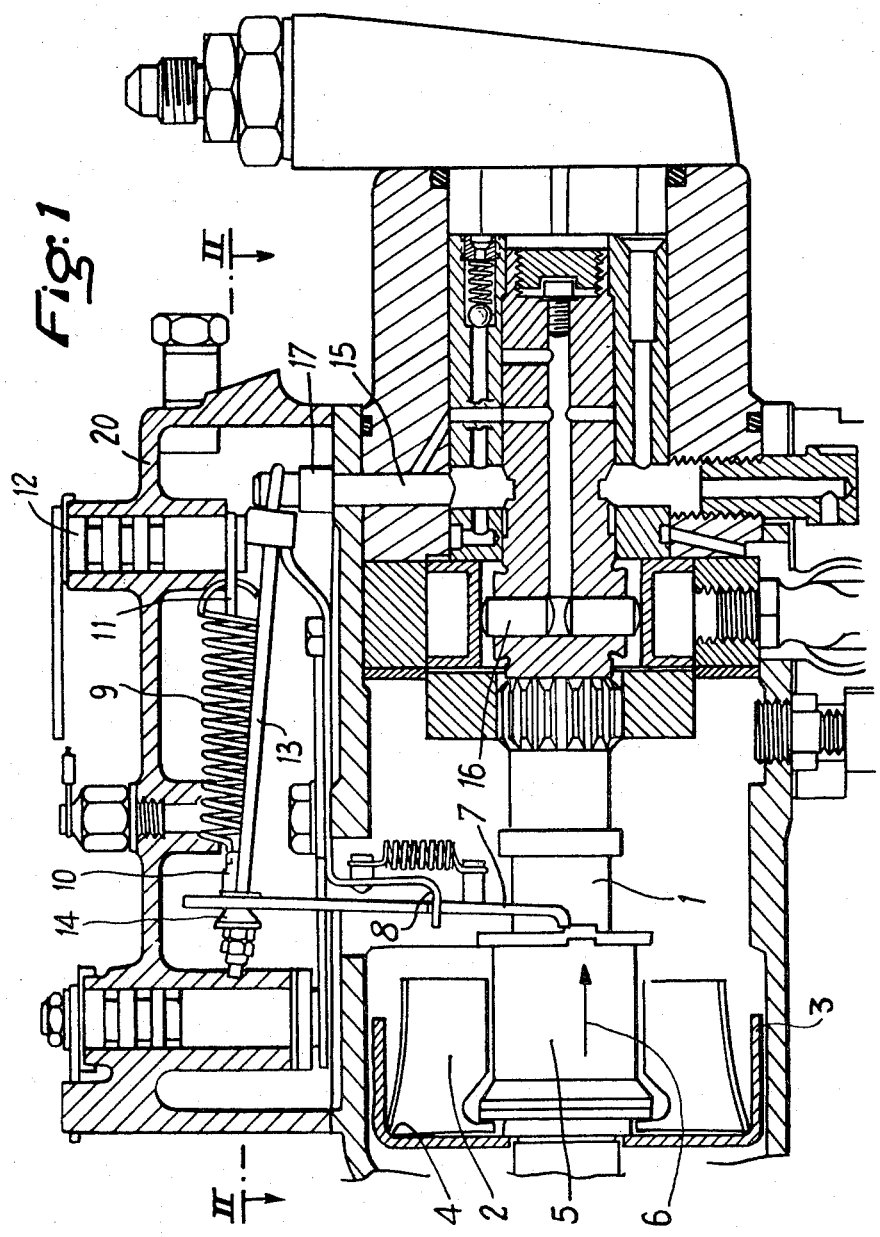
FIG. 1 is a longitudinal section taken through the fuel injection pump.
Figure 2:
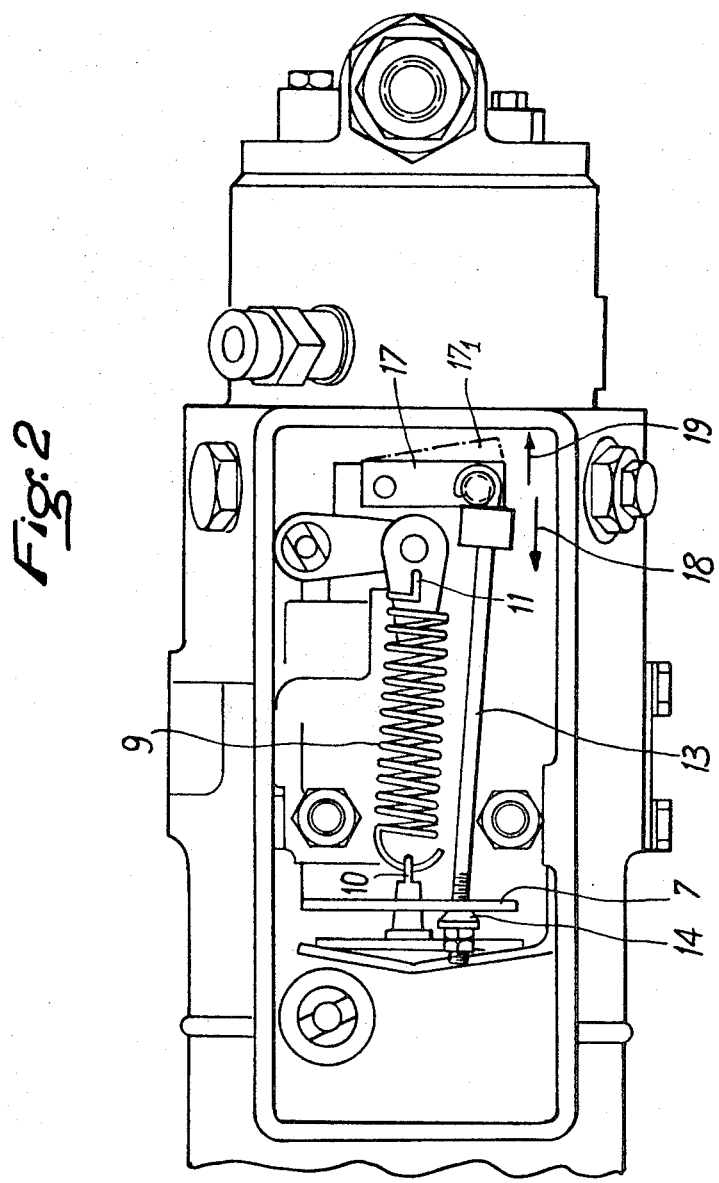
FIG. 2 is a plan view from above of the pump, as seen in the direction of the arrows II—II of FIG. 1.

As shown in FIGS. 1 and 2, the pump shaft 1 is driven from the Diesel engine (not shown). The shaft 1 rotatably drives the inertia weights 2 of a centrifugal governor mounted in a case 3. Each inertia weight 2 engages this case 3 at a fulcrum point 4. The movement of these inertia weights 2 away from the axis of rotation of shaft 1 is attended in the known manner by the axial translation of a socket 5, i.e. in the direction of the arrow 6 (FIG. 1).

It will be noted that this socket 5 is not rotatably rigid with shaft 1 and can slide therealong. This socket 5 abuts a lever 7 fulcrumed about a pivot point 8. The opposite end 10 of this lever 7 has one end of a traction spring 9 attached thereto.

Therefore, the speed whereat the inertia weights 2 begin to move awya from the axis of shaft 1 varies according to the force of spring 9. Thus, the greater the force of spring 9, the higher the speed at which the socket 5 begins to move in the direction of the arrow 6.

The other end of traction spring 9 is attached to a speed display device 12. This device 12 is adapted to display the rotational speed of the Diesel engine as a function of the variations in the force of spring 9. The lever 7 is also connected to a rod 13. Screw-and-nut means 14 are provided for adjusting this rod 13 and therefore the tractive effort exerted on this rod. At its opposite end the rod 13 is adapted to move angularly and adjustment member or metering valve 15 which, according to its angular position, allows more or less fuel to penetrate into the injection pump 16 proper which, in this example, is a radial-piston pump.

The adjustment member 15, in this case a cylindrical valve, is rigid with a control arm 17. When this arm 17 is rotated in the direction of the arrow 18 (FIGS. and 7), the amount of injection fuel is reduced and in the opposite direction (arrow 19, FIG. 2) the amount is increased. Finally, in the position $17_1$ shown in dot-and-dash lines in FIG. 2, a maximum amount of fuel is injected at each piston stroke and the Diesel engine delivers its maximum torque.

Therefore, the position of the arm 17 controlling the adjustment member 15 constitutes a positive indication of the momentary torque delivered by the Diesel engine and therefore of the resistance or load counteracting the engine torque.

Moreover, it is known that when the Diesel engine delivers its maximum torque only a very slight increment in the resistance torque is sufficient for stalling the engine. To avoid this, Diesel engines are generally so adjusted that their torque increases as their speed decreases. Thus, an increment in the resistance torque is attended by a speed reduction and therefore by an increase in the engine torque.

In fact, whatever the pattern or shape of the torque vs. rotational speed curve, it is only necessary, to prevent the engine from stalling, to take care that the torque delivered by the Diesel engine be constantly slightly inferior to its maximum permissible value.

Figure 3:
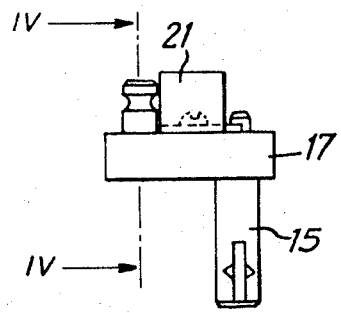
FIG. 3 is a detail view showing the pump adjustment member.
Figure 4:
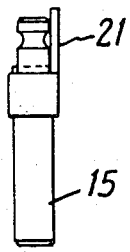
FIG. 4 is a sectional view along the line IV—IV of FIG. 3.
Figure 5:
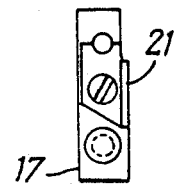
FIG. 5 is a plan view from above of the device of FIG. 4.
Figure 6:
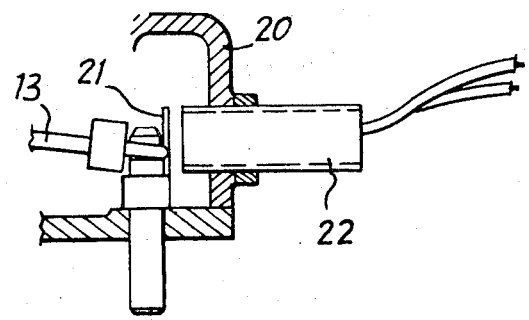
FIG. 6 is a detail view showing in section the adjustment and detecting member mounted in the fuel injection pump.

As shown in FIG. 3 illustrating the adjustment member 15 provided with its control arm 17, a metal lug 21 is disposed above the control arm 17 and rotatably driven from member 15. A proximity detector 22 mounted in the cover 20 of the pump body permits detection of the position of this lug 21 and therefore that of adjustment member 15, so that the electric output signal produced by this detector is a direct function of the torque of the Diesel engine.

By way of example, the proximity detector may be of the resonant circuit type with a built-in modulator and demodulator. Whatever the type of detection contemplated, the torque exerted thereby on control arm 17 must of course be negligible in comparison to the torque transmitted through the rod 13, in order to avoid any disturbance in the pump operation.

Figure 7:
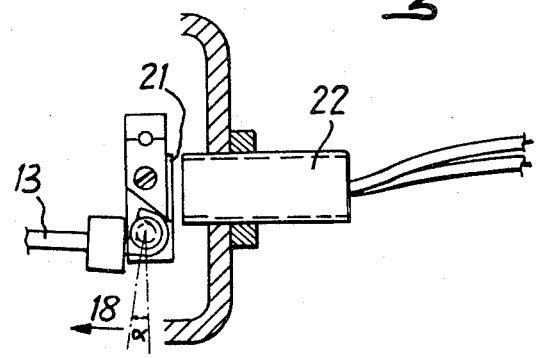
FIG. 7 is a plan view from above the adjustment member.

Let $\alpha$ be the angle designating the position of adjustment member 15 (FIG. 7). When this angle $\alpha$ is directed in the direction of the arrow 18 it will be noted that the output voltage Us of the proximity detector is a functon of said angle $\alpha$.

FIGS. 8, 9, 10 and 11 are typical illustrations of the variations in the output voltage Us of detector 22 as a function of said angle $\alpha$. These curves depend on the type of detector used but in any case the output signal of the detector is a continuous function of the posiion of the adjustment member 15.

It will only be emphasized that in the specific cases of the variations shown in FIGS. 10 and 11 the values $\alpha_a$ and $\alpha_b$ must be adjusted carefully with the assistance of the mechanism controlling said member 15.

Assembly for building up orders of variation in the transmission ratio

The assembly building up the orders for causing the variations in the transmission ratio receives as its input data the output voltage Us of the above-mentioned proximity detector 22, this voltage depending on the position of valve 15 and, in a typical modification of the form of embodiment of the invention, on the temperature of the Diesel engine. Moreover, according to a well-known method, the input signal of the order building assembly may be modified by a correcting circuit adapted to improve the performance of the device.

According to a characteristic feature of this invention, the order building assembly comprises two output paths of which only one generates signals at a given time. According to another feature characterizing this invention, the order building assembly comprises only static members obtained from component elements free of movable contacts.

Let A and B be the output paths of the order building assembly and $\alpha$ the angle indicating the position of control arm 17. FIG. 12 illustrates the signals built up in each path A and B as a function of this angle $\alpha$. According to the diagram illustrated these signals are gating pulses having fixed voltage and frequency and a variable duration.

FIG. 12 shows that with moderate values of said angle $\alpha$ only path A is energized, and that the duration of the signal decreases as angle $\alpha$ increases, until the signal disappears. It is possible to determine a zone of variation of angle $\alpha$ which is limited by the values $\alpha_1$ and $\alpha_2$ wherein neither of these two paths is energized, these values corresponding to the maximum useful engine torque. If the angle $\alpha$ further increases, signals having the same frequency as those of path A and of increasing duration appear in path B until a continuous signal is obtaind.

It will be noted that only the mean value of the signals built up in paths A and B for a given position of control arm 17 is important. Thus, the signals built up could be gating pulses having a constant duration but a frequency depending on the value of angle $\alpha$.

In the example described hereinabove a proximity detector or pick-up device having the response curve shown in FIG. 8 is used. The principle of building up these signals is illustrated in FIG. 13.

A first sub-assembly consisting of members 101, 102, 103 and 104 produces control signals having a fixed frequency and a duration varying periodically as a function of the position of control arm 17.

A second sub-assembly consisting of members 105 and 106 directs the signals towards one of said paths A or B.

As already explained in the foregoing, the output of the order building device comprises two paths. In other words, the passage from one mode of operation, for instance from path A to path B, or vice versa, to another, must be determined by the characteristics of the input signal. Under these conditions, a zone of variation of $\alpha$ must be defined in the vicinity of $\alpha_1$ and such that the output signal is switched from one path to the other. Let Uo be the value of the output voltage Us of the proximity detector corresponding to $\alpha_1$. The member 102 energized by the proximity detecter 22 will build up a signal u such that :

$u$ increases as long as $u_s < u_o$ and $u$ decreases when $u_s > u_o$.

The reference numeral 104 designates a generator of sawtooth signals having constant frequency and amplitude, the amplitude of these signals being slightly inferior to the maximum value of the signal u delivered by detector 102.

In FIG. 13 the block 103 is a voltage comparator delivering gating pulses having the same frequency as the sawthooth signals from generator 104. The width of the voltage gates U 103 depends on the mean value of voltage U 102 (FIG. 14).

Blocks 105 and 105' compare in the known fashion either voltage $u_s$ or voltage $u_0$. Thus, a. if $u_s < i_o$, comparator 105 opens the AND gate 106 and comparator 105' closes AND gate 106', and path A is energized while path B is inoperative ;
b. if $u_s > u_o$, comparator 105' opens AND gate 106', comparator 105 closes AND gate 106 and path B is energized while path A is inoperative.

The electronic diagram of a possible form of embodiment of the measuring assembly is illustrated in FIG. 15.

The assemblies shown in diagrammatic or block form in FIG. 13 are reproduced in detail in FIG. 13.

In section 101 there is shown the device 22 for detecting the position of control arm 17 with its ballast resistor R1. A transistor T1 is provided for adapting the level of the output voltage of stage 101 to the next stage 102. A potentiometer P1 permits the adjustment of the detector gain. Another potentiometer P2 is provided for adjusting the threshold of operation of the system. The thermistance Th located at a suitable point of the Diesel engine constitutes a temperature pick-up device which varies the threshold of operation of stage 101 with the temperature of the Diesel engine. This thermistance will for instance prevent the Diesel engine from delivering its rated power output before the engine has attained its rated or normal operating temperature.

The assembly denoted 102 constitutes a constant-current differential amplifying stage. Transistor T2 is the constant current generator. Other transistors T3 and T4 are mounted symmetrically to constitute a differential system.

The base of transistor T3 is connected to point E1 via a resistor R29. The potential of this point will thus constitute the monotonic function of the position of control arm 17, as well as a function of the Diesel engine temperature and also of the adjustment of potentiometer P2.

The base of transistor T4 is connected to point M1 of potentiometer P3. If the potential of E1 varies from $v_{min}$ to $v_{max}$, the potential of M1 may be selected to be:

$(v_{min} + v_{max})/2$

Under these conditions, if the potential of E1 increases from $v_{ml}$ to $v_{max}$ :

the potential at point C3 decreases,
the potential at point C4 increases and
when the potential of E1 is equal to $(v_{min} + v_{max})/2$ the potential at point C3 will be equal to the potential at point C4.

The assembly consisting of resistors R10 and diodes D1 and D2 permits equalization of the potential of point M2, except for possible voltage drops, at the minimum potentials of C3 and C4.

The assembly 104 is a sawtooth signal generator.

Transistor T9 is a single-junction transistor.

The capacitor C1 is discharged through potentiometer P5 and resistor R18 until point M3 has attained the peak voltage of the transistor T9. At that time the capacitor C1 is discharged through resistor R20 until the potential of M3 attains the loop or antinode voltage of transistor T9. The potential of M3 varies as a sawtooth at a variable frequency due to the presence of potentiometer P5. The output impedance of sawtooth signal generator 104 is reduced by transistor T8. The potentiometer P4 permits adjustment of the amplitude of the sawtooth signals received at M4. This adjustment permits displaying a signal amplitude to transistor T6 and prevents the delivery of any signal to C6. It is thus possible to adjust the amplitude of the angular span in which the control arm 17 will not cause any energization of said paths A and B.

The voltage comparator 103, like assembly 102, is a differential amplifier of the constant-current type, and constant current is delivered through transistor T5.

The constant current as well as the gains of transistors T6 and T7 are such that these operate in the "on-and-off" fashion. When the potential of M4 exceeds that of M2, transistor T6 is saturated and transistor T7 is blocked. When the M4 voltage is lower than the M2 voltage, transistor T6 is blocked and 7 is saturated. Thus, the operation is that illustrated in FIG. 14, signals of constant frequency and variable width being obtained at C6.

The assembly 105, 105' constitutes a differential amplifier (diff amp) operating in a manner similar to assembly 103. Transistors T10 and T11 also operate in the "on-and-off"fashion. When the voltage of C3 exceeds that of 4, transistor T10 is blocked and transistor T11 is saturated. When the voltage of cc3 is below that of C4, transistor T10 is saturated and transistor T11 is blocked. The potential of C10 is then a maximum and that of C11 a minimum.

The assembly 106, 106' comprises two transistors T14 and T13 operating as an AND gate and corresponding to paths A and B, respectively.

Transistor T12 reduces the output impedance of amplifier 103. Thus, low-impedance voltage pulses are obtained at E12.

If the C4 voltage is greater than the C3 voltage, transistor T14 is conducting and T13 is blocked. If the voltage at C4 is lower than the C3 voltage, transistor T14 is blocked and T13 is conducting. According to the type of operation, the signals created at E12 pass through E14 or E13. Transistors T15 and T16 are power transistors driven by T14 and T13, respectively. Members A and B are the elements to be controlled.

The zener diode Z3 regulates the supply voltage fed to assemblies 101, 102, 103, 104, 105 and 105'.

TRANSMISSION RATIO CONTROL ASSEMBLY

In transmissions providing a continuously variable ratio, notably in hydrostatic transmissions, the transmission ratio is determined as a rule by the position of a control lever displaceable manually one either side of a neutral point or position to impart a variable speed or velocity of translation to the vehicle or machine either in forward or reverse drive.

FIG. 16 illustrates diagrammatically a vehicle with its manual control lever 201 adapted to be positioned or set by the driver for obtaining the desired transmission ratio. In most instances this lever 201 controls the transmission ratio through mechanical means.

In the foregoing it is explained that the transmission ratio had to be increased to prevent the engine from stalling, with the reservation that if permitted by the reaction torque it should be possible to restore the transmission ratio preset by the driver.

Under these conditions the order building assembly must not control directly the lever 201. This control action is performed by another transmission ratio control system so that the position of lever 201 constitutes a "memory" position for the ratio desired by the driver.

To this end, it is only necessary that the manual control lever 201 and shaft 204 responsive to the order building assembly be operatively connected with seaparate inputs of a differential mechanism, whether of the lever or gear type, which is illustrated diagrammatically at 202 in FIGS. 16 and 17. In FIG. 17 the shaft 211 controlling the transmission ratio proper is the output member of differential 202. In other applications, for example in the case of a hydraulic power shovel, as long as the power absorbed by the pumps remains lower than that of the thermal engine these pumps must have their cylinder capacity designed for maximum value, but on the other hand when the maximum engine torque is attained the cylinder capacity of these pumps must be reduced. In this case, it is not necessary to use a differential since one of the two inputs has a constant value. Therefore, the cylinder capacity of the pump or pumps is controlled directly by the order building assembly.

FIG. 17 illustrates a typical embodiment of a control device for varying the transmission ratio in the case of a tractor. The hand lever 201 is connected to one input of a differential 202 and the output shaft 211 of this differential controls directly the transmission ratio.

The second input of said differential consists in this example of a shaft 204 rigid with an arm 205 cnnstantly urged by a spring 206 towards a stop 207. A single-acting hydraulic actuator 208 of the conventional cylinder-and-piston type is adapted, when supplied with fluid under pressure, to move the arm 205 in the counter-clockwise direction against the force of spring 206.

Thus, when no fluid is delivered to actuator 208, any transmission ratio or speed set by the manual lever 201 is obtained in the drive.

On the other hand, if fluid under pressure is supplied to the aforesaid actuator 208, the arm 205 is moved against the force of spring 206 and increases the transmission ratio, the piston stroke in said actuator 208 being such that when said arm 205 engages the other stop 207' the vehicle speed is cancelled in case the manual control lever 201 was set in the position corresponding to the minimum possible transmission ratio.

Of course, this device will be particularly advantageous if it is so designed that arm 205 moves through the same angle for cancelling the vehicle speed, irrespective of the position of manual lever 201. The cylinder-and-piston actuator 208 is supplied as follows. The output paths A and B mentioned hereinabove consist in this case of a pair of quick-acting two-way solenoid-operated valves 209 and 210 which, in this specific application, are closed when de-energized. One of the ports or passages of valve 209 is connected to the aforesaid actuator 208 to permit the supply of pressure fluid thereto from a source of hydraulic pressure 212. The other valve 210 is likewise connected to actuator 208 for connecting same to the low pressure side, shown herein in the form of a fluid reservoir 213. Of course, this circuit is shown only diagrammatically in FIG. 17.

OPERATION OF THE CONTROL UNIT

When the tractor is stationary with manual lever 201 in neutral, both solenoid operated valves 209, 210 are deenergized. When the ignition is swtched on, the proximty detector 22 detects a high value $\alpha$ of the position of adjustment member 21 and the order building assembly delivers an energizing voltage for path B. The solenoid operated valve 210 is thus energized and actuator 208 communicates with the reservoir or low-pressure source while the other valve 209 remains de-energized. When the Diesel engine has attained its rated speed the above-described condition of the device is maintained forthe engine operates under no-load conditions and the load detector detects a very considerable value of $\alpha$.

Referring to FIG. 18, plotting engine speed vs. theoretical torque, it is assumed that the driver selects and displays a rotational speed N1 of the Diesel engine which corresponds to a theoretical torque C1.

If C1 is the engine torque corresponding to speed N1, it will be seen that in the curve section PR the metering valve 15 is fully open and the engine delivers the maximum torque corresponding to its regulation.

Between R and N2 (no-load speed) the regulation speed is overstepped and the fuel metering valve is gradually closed. It will be seen that the no-load engine operation will correspond to point M1 in this diagram.

If the load applied to the tractor increases gradually, the point M denoting the engine operation rises along the curve from M1 to R and the angle $\alpha$ corresponding to the amount of fuel injected into the engine decreases.

Referring again to FIG. 12, it will be seen that beyond a maximum value of $\alpha$ the solenoid-operated valve 210 (see B) is de-energized at a costant frequency and during increasingly longer time periods. However, since the actuator 208 is pushed back by spring 206, no variation occurs in the transmission ratio for shaft 204 is stationary. If the point in the curve of FIG. 18 which corresponds to a maximum value of $\alpha$ is M3 and the load continues to increase, the angle $\alpha$ decreases to value $\alpha_2$ beyond which the valve 210 is fully de-energized, thus isolating the actuator 208 from reservoir 213. If the engine load continues to rise the angular position of metering valve 15 becomes $\alpha_1$ (point M5 in FIG. 18), and considering FIG. 12 it will be seen that valve 209 begins to be energized with a constant frequency voltage and an energization time per cycle increasing in proportion as $\alpha$ decreases in relation to $\alpha_1$. Thus, at each electric pulse delivered to valve 209 a small amount of hydraulic fluid is fed to actuator 208 and this amount of fluid increases in proportion with the increment in the distance or difference between $\alpha$ and $\alpha_1$. In other words, the average rate of travel of the piston in actuator 208 increases with the engine load.

This relationship may also be expressed as follows. The higher the tractor load, the higher the speed or rate of change of the transmission ratio. If $\alpha$ attains the value $\alpha_{min}$ the solenoid operated valve 209 remains energized and the rate of variation of the transmission ratio has its maximum value, since point M6 must constantly be slightly inferior to point R. This rate is selected with due consideration to the response time of Diesel engines and also to the specific character of the work to be performed, in order to positively prevent the engine from stalling.

Now let us assume, still for simplifying the explanations, that the engine load decreases continuously. Under these conditions, the cycle is exactly the reverse of the preceding one.

From the value $\alpha 2_{min}$ to value $\alpha_1$, the amount of hydraulic fluid delivered to actuator 208 decreases gradually. At value $\alpha_1$ valve 209 is de-energized and actuator 208 remains in position since the other valve 210 is also de-energized.

If the load continues to decrease, when the metering valve 15 reaches position $\alpha_2$, valve 210 is periodically energized and the energizing time increases as $\alpha_2$, valve 210 is periodically energized and the energizing time increases as $\alpha_2$ decreases in comparison with $\alpha_{max}$. Also in this case the average rate of travel of the piston of actuator 208 is caused to vary.

In view of the foregoing it is clear that the continuous maximum power output delivered by the engine lies between the power outputs corresonding to points M4 and M5, respectively, in the curve of FIG. 18.

As the load continues to decrease, $\alpha$ becomes equal to $\alpha_{max}$ and the transmission ratio becomes equal to the displayed or preset value.

The mode of operation described by way of example hereinabove corresponds to that of a farming tractor operating under hauling or towing conditions (such as ploughing, harrowing, or uphill towing);

In the case of public work or earthmoving machines such as a hydraulic power shovel or the like, the actuator 208 would control directly the transmission ratio. The $\alpha_{max}$ position would then correspond to the maximum cylinder capacity of the hydraulic pump or pumps driven from the thermal engine.

In the case of a machine in which it is desired to have a transmission ratio increasing with load, but without allowing the transmission ratio to subsequently decrease in case of load reduction, unless otherwise decided by the driver who delivers a confirmed order accordingly, it is only necessary, as the load increases, to cause the governor to deliver a signal for energizing the solenoid operated valve 209, during the torque increment beyond its maximum useful value, and to subordinate the delivery of an energizing signal to valve 210 to the preliminary actuation of a manual control member when the torque becomes lower than said maximum useful value. Under these conditions it is clear that the same machine may comprise this regulation system as well as the one described hereinabove, the only requirement being in this case to provide locked positions of the manual control member.

In the case of a machine comprising a single primary power source and a plurality of variable-speed mechanisms, each mechanism is responsive to a device of the type illustrated in FIG. 17. The mode of operation of this device may be illustrated in FIG. 12.

When the angular position of the fuel metering valve 15 lies between $\alpha_1$ and $\alpha'_1$, only the ratio of one transmission is increased and the rate of travel of the piston in actuator 208 increases in proportion to the difference $\alpha-\alpha_1$.

When the position of valve 15 attains the value $\alpha''_1$, the transmission ratio of the second variable-speed mechanism is also increased, although the ratio of the first transmission continues to increase. If the load decreases, the reverse procedure takes place for valve positions $\alpha'_2$ and $\alpha''_2$.

Thus, each variable-speed mechanism may have its transmission ratio adjusted and adapted to be modified by the order building assembly, according to the discrepancy between the torque corresponding to a zero-signal condition in paths A and B, and the actual engine torque.

The control device according to this invention is particularly suitable for various public work, earthmoving and farming machines, and notably those equipped with hydrostatic power transmission equipment.

Among these machines, the following ones may be mentioned, inter alia :

Farming machines and tractors : the driver will no more be confronted with a stalling engine if the latter is equipped with a hydrostatic transmission. The same device is also applicable to a tractor of which the engine delivers power for various uses, such as the vehicle translation and the driving of equipment, such as a bursh-wood cutter or a cutter bar or mower ;

Harvester-threshers ;

Public work machines; etc...

In all cases the essential advantages deriving from the use of the control device of this invention are as follows:

A high degree of flexibility in operation, since the device is adaptable to different power ratings, different types of machines, and also to different types of fuel injection pumps ;

Low cost, since most of its component elements are electronic ones ;

Reliability, since the main component elements are of purely static character.

The slope of the curve shown in FIG. 18, plotting the variation in the engine torque vs. the engine rotational speed, is particularly steep between a no-load engine speed $N_2$ and the engine speed under maximum torque condition between points $M_4$ and $M_5$ of said curve. Only a small variation of the engine speed is sufficient for passing from the inoperative point to the point of operation whereat the fastest action is exerted on the transmission ratio. In certain cases, oscillations in the torque and in the transmission ratio about the rated values of the torque and the transmission ratio corresponding to the inoperative point have been observed.

To avoid this inconvenience, the adjustment range may be increased, but this is attended by a reduction in the power output available. It is also possible to reduce the quickness of variation of the transmission ratio, but this is attended by an increased risk of stalling the engine.

A modified form of embodiment of the structure shown in FIGS. 13 and 15, which is illustrated in FIGS. 19 and 20 of the drawings, results in a device capable of preventing the engine from stalling in case of sudden load increment, while permitting a stable operation of the thermal engine in the vicinity of its maximum torque output. This anti-stalling action is obtained in this case by causing a rapid increment in the transmission ratio. This device is also designed for preventing undesired accelerations of the vehicle and ensures a slow reduction in the transmission ratio in case of a sudden reduction in the engine load.

As shown in FIGS. 19 and 20 :

1. The first path $V_1$ comprises :

a low-pass filter $102_1$ comprising a zener diode $Z_1$ and a capacitor $C_{11}$. This filter is a non-linear one due to the characteristic of its diode $Z_1$ and eliminates from the voltage signals $U_1$ received by this filter from the detector 101 the alternating portion having a high frequency and an amplitude inferior to the voltage of the zener diode. Detector 101 is associated with the injection control INJ co-acting with a speed governor 100 ;

an amplifer circuit $102_2$ and the corrector network operating by phase lead (through a capacitor $C_{12}$ in series with a resistor $R_{30}$), and two zener diodes $Z_2$, $Z_3$ permitting limitation of its output voltage whereas two resistors $R_{31}$ and $R_{32}$ determine its gain;

A sawtooth signal generator 104 having a high frequency in comparison with the inherent frequency of the transmission, as already described hereinabove ;

two comparators $103_a$ and $103_b$ having three input resistors $R_{33}$, $R_{34}$ and $R_{35}$ comparing the signals from generator 104 and amplifier $102_2$ ;

two power transistor amplifiers $106_a$ and $106_b$, of a type known per se.

2. The second path $V_2$ comprises :

a low pass filter 107 similar to filter $102_1$, which receives signals from detector 101 ;

a derivator 108 with a diode $D_2$ in parallel with a resistor $R_{38}$ preventing negative outputs, an input resistor $R_{39}$ connected to filter 107, and an input resistor $R_{40}$ receiving an additional positive input voltage $V_9$ constituting the threshold of the derivative of the input signal beyond which no output signal can be produced, the output of branch circuit 108 being connected to an input resistor $R_{41}$ of comparator $103_b$.

Referring to FIGS. 19 and 21, the device operates as follows :

The position detector 101 of the engine torque adjustment member is set to deliver a voltage $U_1$ proportional to the discrepancy between the actual engine speed and the speed $V_{MCM}$ corresponding to the maximum useful torque. Voltage $U_1$ is positive when the engine speed is greater than $V_{MCM}$.

The voltage $U_1$ from which the strays are eliminated by means of the low pass filter $102_1$ is fed to amplifier circuit $102_2$ limiting the discrepancies between the speeds ($N_7 - V_{MCM}$) and ($V_{MCM} - N_9$) measured by the zener diodes $Z_2$ and $Z_3$, and of which the correct network permits "optimization" of the damping action produced in the device.

The output voltage $U_2$ of amplifier circuit $102_2$ is added in comparator $103_a$ to the output voltage $U_3$ of generator 104 and to the level adjustment voltage $U_4$. The amplifier of comparator $—_a$ has a considerable gain and only two stable output voltages $U_5$, according to whether the sum $U_2 + U_3 + U_4$ is positive or negative.

The voltage $U_5$ controls the input element A' actuating the transmission ratio adjustment member RT in the direction to reduce this ratio, through the transistor amplifer $106_a$, the energizing coil of said element A' being inserted in the collector circuit of transistor $T_18$. Similarly, the voltage $U_2$ controls the input element B' actuating the transmission ratio adjustment member in the direction to increase this ratio, through the medium of comparator $103_b$ set at a different level $U_6$ and amplifier $106_b$. The input element B' is controlled when no signal $U_7$ is present in path B'.

The diagram of FIG. 22 shows the evolution of signals $U_1$; $U_2$; $U_2+U_3+U_4$; $U_5$ for controlling the path A', and of signals $U_2+U_3+U_6$; $U_8$ for controlling the other path B', in the absence of signals $U_7$, and for different engine speeds in relation to $V_{MCM}$ which is the engine speed under maximum torque conditions.

It will be seen that with this arrangement it is possible to produce control signals applicable to paths A' and B' in the form of gates having a width $l$ variable as function of the discrepancy between the momentary speed $V_M$ of the engine and the maximum speed under maximmm torque $V_{MCM}$.

It will also be seen that for momentary engine speeds greater than $N_7$ or lower than $N_9$ the useful width $l_1$ of the gate signals remains constant and moderate compared with the cycle T of the generator thus involving low maximum rates of variation in the transmission ratio compared with the variation corresponding to the permanent energization of paths A' or B'.

During a deceleration of the thermal engine, beyond the deceleration threshold determined by the input voltage $V_9$ of branch circuit 108, the output voltage $U_7$ of this branch circuit adds itself to the output voltage $U_2$ of amplifier $102_2$ for controlling an increment in the transmission ratio. Whatever the value of said voltage $U_2$, the comparator $103_b$ is so designed that the maximum deceleration of the thermal engine (to which corresponds the fastest load increment which the machine is likely to encounter) generates a positive voltage $U_8$ leading to a transmission ratio increment at the maximum rate of variation $R_1$.

The engine deceleration threshold below which the second path $V_2$ does not issue any signal should not be too great, for said threshold would impair the anti-stalling action. In fact, this threshold should be sufficient to prevent any action of path $V_2$ on the transmission ratio in case of a small load variation adapted to be compensated by the first path $V_1$ alone. Thus, periodical instability which would render the device useless is safely avoided.

The device thus constructed permits utilization of more power since the torque corresponding to the rest point $M_8$ (FIG. 21) is greater than the torques corresponding to points $M_4$ and $M_5$.

Moreover, the anti-stalling device does not produce any distortion in the torque curve of the regulator, and permits obtaining of an operation at point $M_{10}$.

On the other hand, the precision obtained in the position of point $M_8$ is substantially without any influence on the useful torque. Under these conditions a less accurate and therefore more economical detector may be used.

It would not constitute departure from the basic principle of this invention to take the thermal engine deceleration data through means other than the derivation of the detector signal, for example by derivating the signal delivered by a tachometric generator driven from the engine by using an accelerometer, or any other means well known to those conversant with the art.

According to another modified form of embodiment of this invention the path $V_2$ may comprise a memory device reading the deceleration value at a given time and delivering an order for increasing the transmission ratio at the maximum rate of variation $R_1$ during a time increasing with the deceleration value. When the corresponding order has been executed, the memory device reads again automatically the deceleration for issuing another order. It will be noted that the time during which the order for increasing the transmission ratio is delivered should remain definitely lower than the time necessary for changing from the minimum transmission ratio to the maximum transmission ratio. Thus, an abnormally high increment in the transmission ratio is safely avoided in case of a sudden but short duration load increment.

What is claimed as new is :

1. Device for controlling a transmission, which comprises a primary generator, a member for adjusting the generator torque, a proximity detector providing a first output signal that is a continuous function of the position of said adjustment member, a variable-ratio hydraulic transmission mechanism, a two-path governor connected to said proximity detector and providing second output signals on said paths, means, responsive to second output signals on the paths of said governor, for controlling the transmission ratio variations, said governor including means, providing electrical third output signals, for comparing the positions of said adjustment member with respect to a reference position corresponding to the maximum torque of said generator, wherein the second output signals on said paths are constant frequency rectangular signals of a width corresponding to the time period during which the corresponding path is energized, said signal width being a monotonic function of the absolute value of the third output signals delivered by said comparison means.

2. Control device as set forth in claim 1 further comprising means for detecting the temperature of said generator during the operation thereof, said proximity detector being responsive to said temperature detecting means.

3. Control device as set forth in claim 2 wherein the second output signals on said two paths of said governor energize a pair of solenoid-operated two-way valves, the first way of each of said solenoid-operated valves being connected to the cylinder of a hydraulic ram, the second way of each of said solenoid-operated valves being connected to a source of hydraulic pressure and to a low pressure line, respectively.

4. Control device as set forth in claim 3 wherein the mean output of said solenoid-operated valves is a substantially continuous function of the energizing signals of said solenoid-operated valves.

5. Control device as set forth in claim 3 wherein said hydraulic ram responsive to said valves is connected to the variable-ratio transmission mechanism via a differential mechanism having a first input from said hydraulic ram, said differential mechanism having connected thereto a manual adjustment member constituting a second input thereof.

6. Control device as set forth in claim 3 wherein said governor delivers an output signal for energizing one of said solenoid-operated valves during the increment of the torque beyond its maximum useful value and another output signal for energizing the other solenoid-operated valve when the torque decreases below said maximum useful value, said other output signal being subordinate to the preliminary actuation of a manual control member.

7. Control device as set forth in claim 6 wherein the manual control member is adapted to be locked in one of its operative positions.

8. Control device as set forth in claim 1 comprising a plurality of continuous variators receiving the output of a single generator, wherein each variator has a transmission ratio adjusted and adapted to be modified by said governor sequentially and in a predetermined order as a function of the discrepancy between the torque corresponding to the absence of signals in the two paths of said governor and the actual torque of the generator.

9. Control device as set forth in claim 1 wherein said governor comprises a first path and a second path controlling two input members, respectively, of said tranmisssion ratio variations control device, said first path comprising itself two paths each adapted to be energized according to whether the generator torque is higher or lower, respectively, than the maximum useful torque value and having an output voltage which is an increasing function of the discrepancies between the instantaneous speed of said generator and the generator speed at said maximum torque, the maximum value of said function corresponding to a rate of control of the tranmission ratio variation which is low in comparison with the control rate necessary for preventing the generator from stalling, the second path comprising an assembly responsive to the instantaneous engine speed and producing an output voltage which is an increasing function of the engine deceleration, the maximum value of said deceleration corresponding to the rate of variation of the transmission which is necessary for producing the anti-stalling action.

10. Control device as set forth in claim 9 wherein said second path emits an output signal the amplitude of which corresponds to the rate of variation of the transmission ratio which is necessary for producing the anti-stalling action, the duration of said output signal on said second path being proportional to the instantaneous generator deceleration.

* * * * *